United States Patent [19]

Skoretz

[11] Patent Number: 4,969,290
[45] Date of Patent: Nov. 13, 1990

[54] APPARATUS FOR EVEN EXPOSURE OF PLANTS TO SUNLIGHT

[75] Inventor: Dallas Skoretz, 1215 U.S. 41 Hwy., N., Calhoun, Ga. 30701

[73] Assignees: Rudolph Skoretz; Dallas Skoretz, Calhoun, Ga.

[21] Appl. No.: 349,520

[22] Filed: May 9, 1989

[51] Int. Cl.$^5$ .......................... A47F 5/02; A47G 7/02
[52] U.S. Cl. ........................................ 47/39; 248/349; 248/522; 108/20
[58] Field of Search ................ 108/20, 103, 104, 139, 108/140; 248/349, 521, 522; 47/65, 39; 219/10.55 F

[56] References Cited

U.S. PATENT DOCUMENTS

| | | | |
|---|---|---|---|
| 980,328 | 1/1911 | Nora-Gon | 108/140 |
| 985,545 | 2/1911 | Pflasterer | 248/522 |
| 1,479,618 | 3/1921 | Mansbendel . | |
| 3,246,613 | 4/1966 | Johnston | 108/20 |
| 3,360,885 | 1/1968 | St. Clair . | |
| 3,897,063 | 7/1975 | Lehwalder | 108/103 X |
| 4,026,067 | 5/1977 | Wengel | 47/39 |
| 4,051,627 | 10/1977 | Schilling, Jr. | 47/39 |
| 4,330,696 | 5/1982 | Pomeroy | 248/349 X |
| 4,504,715 | 3/1985 | Jorgensen | 108/20 X |
| 4,555,990 | 12/1985 | Egawa | 108/20 |
| 4,579,473 | 4/1986 | Brugger | 248/349 X |

FOREIGN PATENT DOCUMENTS 2067837  7/1981  United Kingdom ................ 47/39

Primary Examiner—Henry E. Raduazo
Assistant Examiner—Jerrold D. Johnson
Attorney, Agent, or Firm—Thomas & Kerr

[57] ABSTRACT

An apparatus for even exposure of potted plants to sunlight includes a base, a potted plant receiving platter rotatably mounted to said base with the platter having an upstanding peripheral flange bounding an interior portion of the platter. A shroud is mounted to the base and defines a cowl which overlies the platter's peripheral flange to confine dirt and water to the interior portion of the platter. The platter has peripheral gear teeth and an electric motor and drive assembly is coupled to the platter for rotation thereof at predetermined timed intervals. An optional wheeled carriage can be mounted to the base with the carriage wheels rotatably coupled for movement of a plant across a support surface. A set of slave units including rotatable platters can be interconnected together and to a powered master unit for simultaneous rotation of many plants.

16 Claims, 3 Drawing Sheets 4,969,290

APPARATUS FOR EVEN EXPOSURE OF PLANTS TO SUNLIGHT

TECHNICAL FIELD

The present invention relates to potted plants and more particularly to devices for rotating and moving potted plants to insure even solar exposure for symmetrical growth.

BACKGROUND OF THE INVENTION

It is well known that growing plants tend to seek and grow in the general direction of a light source such as sunlight. This tendency can result in unattractive, asymmetrical plants and is a particular problem with house plants which tend to grow laterally toward the windows of a room. To solve this problem, it has been common in the past for plants to be manually rotated and moved occasionally such that each side of the plant receives substantially even exposure to sunlight causing the plant to grow symmetrically. This manual method works well when practiced methodically but is subject to forgetfulness and cannot be practiced at all during vacations or other times when a house is unattended.

Devices for automatically rotating plants to insure even exposure have been developed with some examples being illustrated in U.S. Pat. Nos. 3,360,885; 4,026,067; and 4,051,627. While the devices of these patents solve some of the above referenced problems, many problems still remain unaddressed. In particular, these devices are in general adapted to support and rotate only a single potted plant such that a complete independently powered unit must be purchased for each plant to be tended. Further, water and dirt from plants supported on these devices tends to collect beneath their rotating platters necessitating periodic disassembly for cleaning and contributing to deterioration of working parts. Finally, these devices only provide rotational movement of plants supported thereon. In many instances, such as in store front windows, lateral movement of plants across a support surface for display may also be desired.

It is thus seen that a need exist for a device adapted to rotate potted plants for even exposure to sunlight which resists accumulation of dirt within the device, is adapted to rotate more than one plant and can be configured to move plants laterally across a support surface for display. It is to the provision of such a device that the present invention is primarily directed.

DETAILED DESCRIPTION

Figure 1:
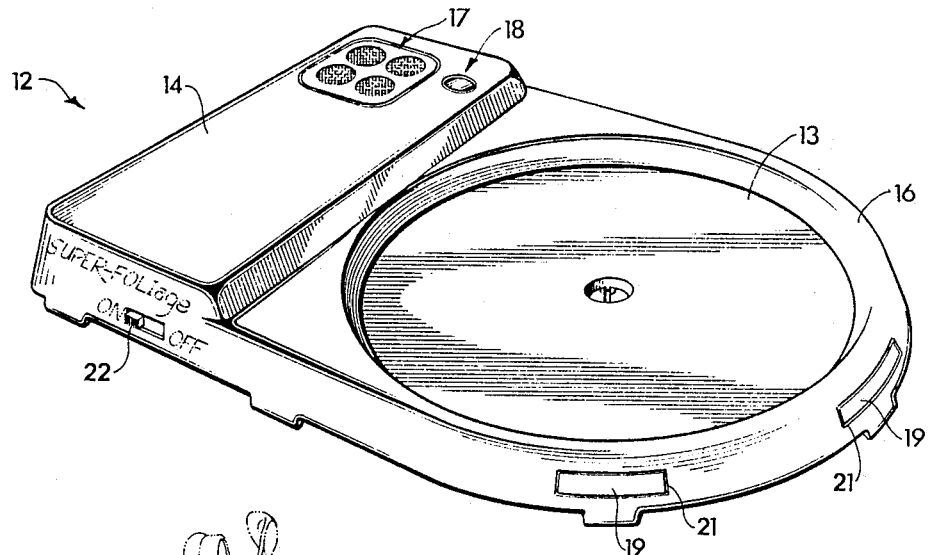
FIG. 1 is a perspective view of an apparatus which embodies principles of the present invention in a preferred form.

Referring now to the drawings in which like numerals represent like parts throughout the several views, FIG. 1 illustrates a motor driven master unit potted plant turntable 12 having a rotatable platter 13. A shroud 14 covers and protects interior working parts of the turntable and is formed to define a cowl 16 which extends over and covers the peripheral portion of the platter 13.

Solar cells 17 are mounted to the shroud 14 for charging operating batteries within the turntable when the cells are exposed to light and a light sensitive switch 18 is electrically coupled to disconnect power to the drive assembly 29 (FIG. 3) in the absence of sunlight. While the solar cells and switch are shown mounted to the top of the shroud in FIG. 1, they could be alternately positioned such as on the side of the shroud if desired for more direct exposure of the cells to sunlight.

Removable panels 19 cover openings 21 formed in the shroud 14. With the panels 19 removed, the peripheral edge portion of the platter 13 is exposed through openings 21 for purposes set out below. An electrical switch 22 is provided for manual activation or deactivation of the unit as desired.

Figure 2:
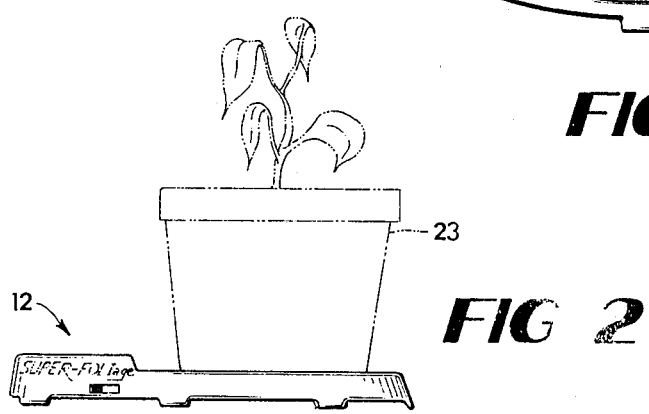
FIG. 2 is a side elevational view of the apparatus of FIG. 1 shown supporting a potted plant.
Figure 3:
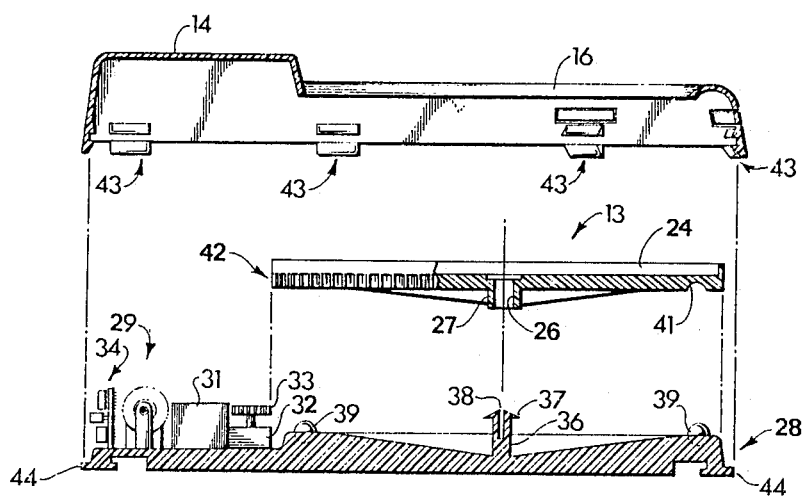
FIG. 3 is an exploded sectional view of the apparatus of FIG. 1 with internal parts revealed.

FIG. 2 illustrates a potted plant 23 supported for rotation upon the master unit turntable 12. FIG. 3 is an exploded sectional view of the turntable of FIG. 1 showing internal parts thereof. The platter 13 is seen to have an upwardly extending peripheral flange 24 which bounds an interior portion of the platter. A central bore 26 is formed through the platter and through a depending post 27 for rotational mounting of the platter 13 upon the base 28 which is adapted to receive the platter 13 and the shroud 14.

A drive assembly 29 of generally conventional construction is mounted to the base 28 and includes an electric motor 31 coupled to a gear box 32 from which extends a drive gear 33 which is rotated in response to actuation of the electric motor 31. A timer 34 is electrically coupled in circuit to actuate the electric motor 31 at predetermined timed intervals.

A post 36 extends upwardly from the base 28 and is sized and positioned to be received through the central bore 26 of the platter 13. A longitudinally extending slit 38 is formed in the post 36 to define left and right halves thereof and a rim 37 extends outwardly from the top portion of the post 36. With this configuration, the platter 13 can be moved downwardly onto the base with the halves of the post 36 being squeezed together to allow the post to move through the central bore 26 of the platter 13. When the upper rim 37 of the post 36 clears the top portion of the central bore 26, the post halves spring apart with the upper rim 37 extending about the mouth of the bore 26 to secure the platter in place for rotation upon the base 28.

A set of roller bearings 39 are rotatably mounted to the base as shown and an annular bearing race 41 is formed in the bottom of the platter 13 and positioned to receive the bearings 39 when the platter is mounted to the base 28. In this way, the platter 13 can be mounted to the base 28 for rotation about the upstanding post and with the peripheral portions of the platter movably supported by the roller bearings 39 nestled within the bearing race 41.

A set of gear teeth 42 is formed about the peripheral edge of platter 13 with the teeth being adapted to mesh with the teeth of the drive gear 33 when the platter 13 is mounted to the base 28. The mounted platter 13 is thus rotated in response to rotation of the drive gear 33 which, in turn, is rotated in response to actuation of the electric motor 31.

The interior portion of the shroud 14 includes combination feet and clip members 43 and the base 28 includes a set of outwardly extending tangs 44 positioned to align with the clip members 43. In this way the tangs 44 are securely received into the clip members 43 as the shroud is moved downwardly onto the base such that the shroud can be snapped and secured into position on the base 28.

Figure 4:
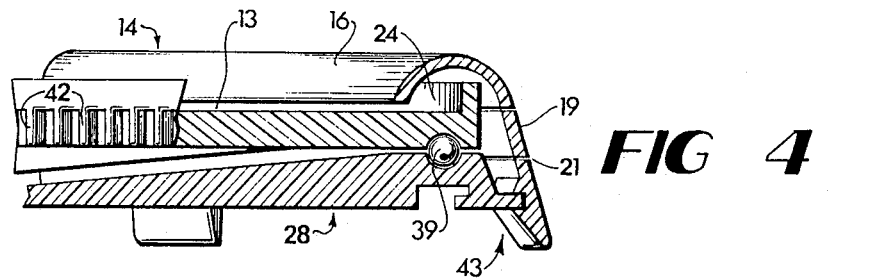
FIG. 4 is a sectional view of a portion of the apparatus showing the platter peripheral flange and overlying cowl.

FIG. 4 is an enlarged sectional view of a peripheral portion of the turntable 12 showing the platter 13 mounted to the base 28 with its periphery supported by roller bearings 39. The shroud 14 is shown clipped to the base 28 and is seen to define a cowl 16 which extends up and over the periphery of the platter 13 to cover the platter's upstanding peripheral flange 24. In this way, dirt and water, which inevitably fall as plants are tended, is confined by the flange 24 and overlying cowl 16 to the central portion of the platter 13 where it can be easily removed. Periodic disassembly and cleaning of the turntable often required with prior art devices is thus eliminated.

Figure 5:
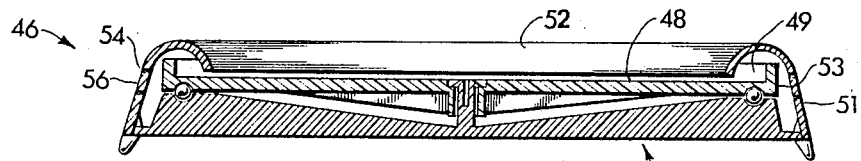
FIG. 5 is an elevational sectional view of a slave unit for use with the apparatus of FIG. 1 to rotate additional plants.

FIG. 5 illustrates an unpowered slave unit turntable usable with the master unit turntable of FIG. 1 to rotate additional plants. The slave unit 46 is similar in construction to the master unit discussed above and includes a base 47 to which is rotatably mounted a platter 48 having an upstanding peripheral flange 49. A slave unit shroud 51 is also mounted to the base as shown and defines a cowl 52 which overlies the platter peripheral flange 49 to confine dirt and water to the interior portion of the platter 48 for easy cleaning. The slave unit platter 48 includes peripheral gear teeth 53 and a set of openings 54 covered by removable tabs 56 are positioned to expose the platter's gear teeth 53 through the openings 54 upon removal of the tabs for interconnection of slave and master units as described below.

FIGS. 6-9 illustrate operative interconnection of slave unit turntables to a master unit turntable to provide a matrix of rotating, plant supporting turntables all powered by the master unit drive assembly 29. For such interconnection, an idler gear assembly 57 includes an idler gear 58 rotatably mounted within an idler gear housing 59 with opposed edge portions of the idler gear exposed beyond ends of the housing 59. Opposed arcuate lips 61 are formed on the idler gear housing 59 and resilient clip members 62 extend outwardly from opposed edges of the housing openings.

Figure 6:
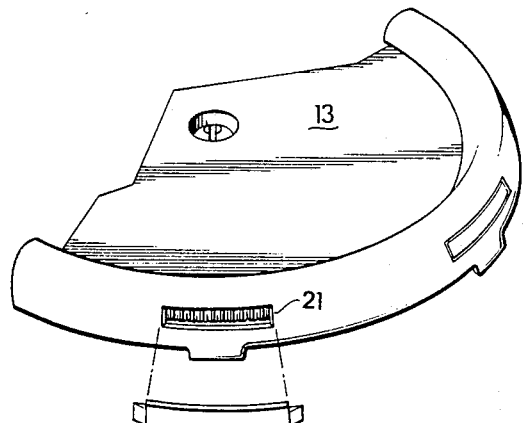
FIGS. 6–8 illustrate a method of rotatably coupling unpowered slave units together and to the apparatus of FIG. 1 for rotation of additional plants.
Figure 7:
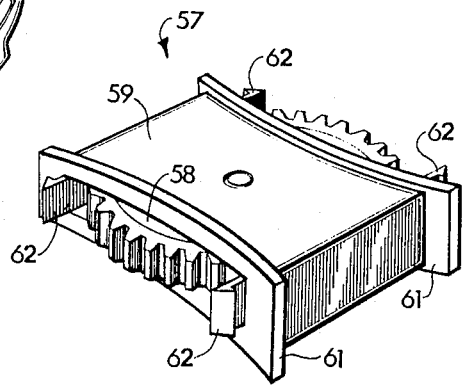
Figure 8:
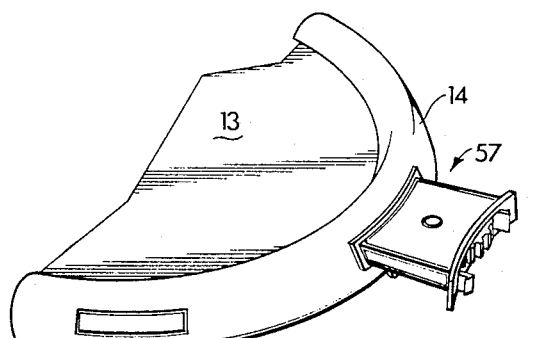

As shown in FIG. 6, panels 19 can be removed from their positions covering openings 21 of the master unit shroud 14 to expose the geared peripheral edge of the platter 13. The idler gear assembly 57 can then be snapped into position covering the opening 21 with the clip members 62 and the lips 61 together releasably securing the housing 59 to the master unit shroud 14. With the idler gear assembly thus in place, an exposed edge of the idler gear extends into the shroud 14 to mesh with the peripheral gear teeth of the platter 13 such that rotation of the platter 13 also rotates the idler gear 58 within the idler gear housing 59.

Figure 9:
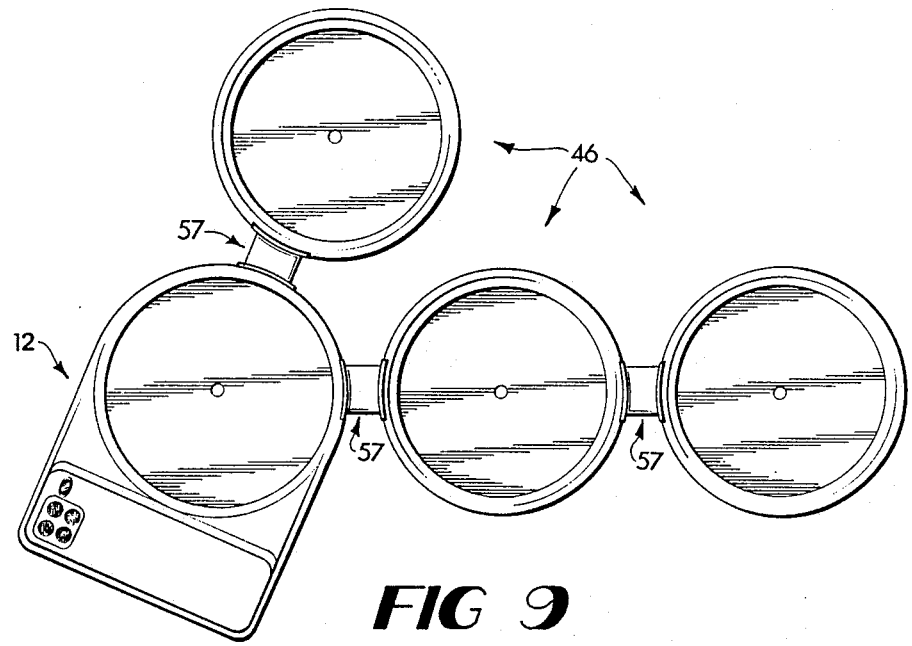
FIG. 9 shows a number of slave units rotatably coupled together and to an apparatus of FIG. 1.

As illustrated in FIG. 9, with the idler gear assembly 57 secured in place on the master unit, a slave unit 46 can be similarly secured to the other end portion of the idler gear assembly 57 with the opposed exposed edge of the idler gear 58 meshing with the gear teeth of the slave unit platter 48.

It can thus be seen that with the master and slave units coupled together by the idler gear assembly, rotation of the master unit platter is transferred through the idler gear to rotate the slave unit platter. The just described process can be repeated as desired to interlink an array of slave unit turntables with a master unit turntable as shown in FIG. 9. The number of slave units which can be thus linked is limited only by available space and by the power of the electric motor 31 within the master unit 12. With this arrangement, many potted plants can be rotated simultaneously by one master unit turntable coupled to a matrix of interconnected slave unit turntables.

Figure 10:
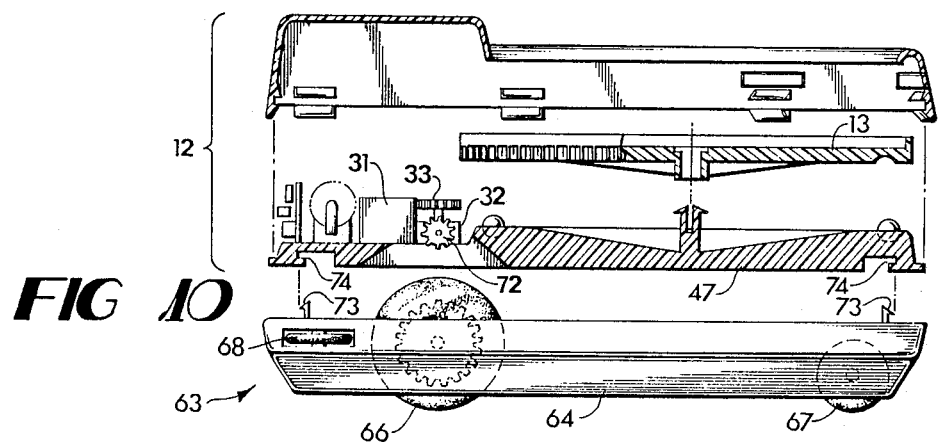
FIG. 10 is an exploded sectional view of a further embodiment of the invention including a wheeled carriage for lateral movement of plants across a support surface.
Figure 11:
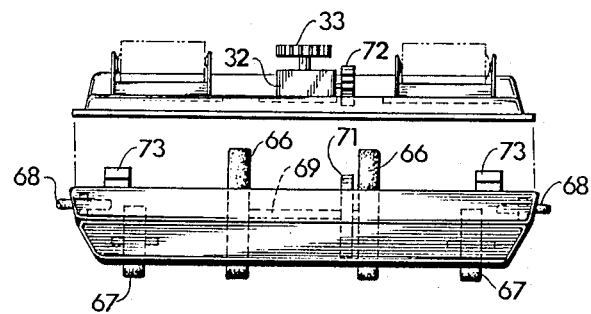
FIG. 11 is an exploded view of the embodiment of FIG. 10 as seen from the left in FIG. 10.

FIGS. 10 and 11 illustrate an embodiment of the invention adapted for lateral movement or translation of a supported plant across a support surface as well as rotation of the plant. The turntable 12 of this embodiment is substantially identical in construction to that previously described. Releasably mountable to the bottom of the turntable 12 is a carriage 63 which includes a carriage frame 64. A first set of wheels 66 and a second set of wheels 67 are rotatably mounted to the carriage and positioned for movable support of the carriage on a surface. A pair of small guide wheels 68 is also rotatably mounted to the carriage with the guide wheels extending outwardly from opposed edge portions of the carriage 63 for purposes set out below.

The first set of wheels 66 are mounted to the end portions of an axle 69 which is in turn rotatably attached to the carriage frame 64. A gear 71 is mounted to the axle 69 adjacent one of the wheels 66 such that rotation of the gear 71 causes the wheels 66 to rotate and consequently causes the carriage to move across its support surface.

Resilient clips 73 extend upwardly from the carriage 63 and are positioned for snapping engagement with inwardly extending tangs 74 formed in the bottom portion of the turntable base 47. The gear box 32 of this embodiment includes a second drive gear 72 which extends outwardly therefrom at right angles with respect to the platter drive gear 33. As illustrated in FIG. 11, the drive gear 72 and driven gear 71 are sized and positioned to mesh when the base of the turntable is snapped into position upon the carriage 63. Drive gears 33 and 72 are preferably rotated simultaneously upon actuation of the electric motor 31. In this way, the platter 13 is rotated and the carriage 63 is simultaneously translated across its support surface so that a plant positioned upon the platter is both rotated and moved laterally across a surface upon actuation of the motor 31.

The just described embodiment is adapted for use with a track (not shown) constructed with side walls that extend upwardly a distance greater than the height of the guide wheels 68 above a support surface. In this way, the guide wheels 68 engage the walls of the track as the carriage moves across the surface such that the carriage, turntable and supported plant are guided around the track by the interacting track walls and guide wheels while the plant is simultaneously rotated upon the platter 13. This configuration is particularly useful in nursery or flower shop showrooms where a portion of the track can be positioned to pass a display window and a large number of turntables placed within the track. Each of the many plants which may be supported atop the turntables then pass the display window in turn such that the display continually changes while at the same time the plants are rotated for even solar exposure and symmetrical growth.

The drive assembly and timer herein described are of conventional construction with the electric motor preferably being battery operated for independent operation. The timer could be of any conventional electronic design such as, for example, an integrated circuit timer of the type available from National Semiconductor and designated 2N555. Further, solar cell battery charging devices and light sensitive switches such as photo resistors are well known and available from many electronic vendors. Further, while time intervals between plant rotations as well as degree of rotation might vary depending upon light conditions and plant type, it has been found that a ninety degree rotation of the turntable and supported plant every 15 minutes provides superior results with average house plants. Finally, while the component parts of this invention could be formed of various materials, it is preferable that they be formed of semi-rigid injection molded plastic which is economical, durable, easily cleaned and exhibits a natural resiliency for convenient snap-together assembly of the various parts.

The invention has been described in terms of preferred embodiments. It will be obvious that many modifications, deletions and additions could be made to the described embodiments without departing from the scope and spirit of the invention as set forth in the following claims.

I claim:

1. An apparatus for even exposure of plants to radiation, said apparatus comprising:
    a base;
    a platter having a central axis and being mounted to said base for rotation about said central axis;
    a peripheral flange extending upwardly from and bounding an interior portion of said platter;
    motor means operatively coupled to said platter for rotation thereof; and
    shroud means mounted to said base with said shroud means formed to define a cowl extending over said peripheral flange;
    whereby a potted plant positioned upon the platter can be rotated therewith for even radiation exposure and falling debris from the plant is confined by the flange and cowl to the central portion of the platter where it can be easily removed.

2. The apparatus of claim 1 wherein said platter is generally disk shaped and has gear teeth formed about its periphery and wherein said motor means includes a drive gear positioned to mesh with said gear teeth for rotation of said platter upon actuation of said motor means.

3. The apparatus of claim 2 wherein said platter includes a central bore and said base includes an upstanding post extending through said central bore whereby the platter is rotatable about the upstanding post.

4. The apparatus of claim 3 further comprising a set of roller bearings rotatably mounted to said base and positioned for movable support of the periphery of said platter during rotation thereof.

5. The apparatus of claim 4 wherein said platter includes an annular bearing race positioned to receive said roller bearings.

6. The apparatus of claim 1 further comprising a carriage adapted to move said apparatus across a support surface with said carriage comprising:
    a carriage frame;
    a first set of wheels rotatably mounted to said carriage frame;
    a second set of wheels rotatably mounted to said carriage frame;
    said first and second sets of wheels being positioned for movable support of said carriage upon a surface; and
    drive means operatively coupled to said first set of wheels for driven rotation thereof.

7. The apparatus of claim 6 wherein said platter is generally disk shaped and has gear teeth formed about its periphery and said motor means includes a first drive gear positioned to mesh with said gear teeth for rotation of said platter upon actuation of said motor means.

8. The apparatus of claim 7 further comprising a driven gear coupled to said first set of wheels and wherein said drive means comprises a second drive gear operatively coupled to said motor means and positioned to mesh with said driven gear whereby the first set of wheels are driven by the motor means and second drive gear to move the apparatus across a support surface.

9. The apparatus of claim 8 wherein said first drive gear and said second drive gear are each coupled to said motor means for simultaneous rotation of said drive gears upon actuation of said motor means whereby a potted plant positioned on the platter is simultaneously rotated and translated across a support surface upon activation of the motor means.

10. The apparatus of claim 9 further comprising timing means coupled to said motor means for activation of said motor means at predetermined timed intervals.

11. The apparatus of claim 10 wherein said motor means comprises a battery operable electric motor and wherein said apparatus further comprises solar cell means electrically coupled for charging a set of batteries connected to said motor means upon exposure of said solar cell means to radiation.

12. The apparatus of claim 11 further comprising radiation sensitive switch means electrically coupled in circuit with said electric motor to disrupt electric power to said motor in the absence of radiation.

13. A system for even exposure of potted plants to radiation with said system comprising:
    a master unit having a base, a potted plant receiving platter mounted to said base for rotation about a central axis of said platter and motor means coupled with said platter for rotation thereof;
    a slave unit having a base and a potted plant receiving platter mounted to said slave unit base for rotation about a central axis of said slave unit platter; and
    coupling means for rotatably coupling said slave unit platter with said master unit platter; said master unit platter and said slave unit platter being substantially disk shaped with each platter having gear teeth formed about its periphery, said coupling means comprising an idler gear assembly including an idler gear rotatably mounted within an idler gear housing with opposed edge portions of said idler gear being exposed, said idler gear assembly being releasably mounted to said master unit and said slave unit with said opposed edge portions of said idler gear operatively meshed with the gear teeth of said master unit platter and said slave unit platter, whereby the master unit platter is rotated in response to activation of the motor means with its rotation being transferred through the coupling means to rotate the slave unit platter.

14. The system of claim 13 further comprising a peripheral flange mounted to said master unit platter bounding an interior portion thereof and a shroud mounted to said master unit base with said shroud being formed to define a cowl extending over said peripheral flange of said master unit platter whereby debris falling from a potted plant positioned upon the master unit platter is confined by the flange and cowl to the interior position of the platter where it can be easily removed.

15. The system of claim 14 further comprising a peripheral flange mounted to said slave unit platter bounding an interior portion thereof and a shroud mounted to said slave unit base with said shroud being formed to define a cowl extending over said peripheral flange of said slave unit platter whereby debris falling from a potted plant positioned upon the slave unit platter is confined by the flange and cowl to the interior portion of the platter where it can be easily removed.

16. The system of claim 15 wherein said master unit shroud is formed with at least one opening positioned adjacent the periphery of said master unit platter and wherein said slave unit shroud is formed with at least one opening positioned adjacent the periphery of said slave unit platter, said idler gear housing being adapted to be releasably mounted to said master and slave unit shrouds covering said openings with said idler gear opposed edges extending through said openings to mesh with said master and slave unit platter gear teeth.

* * * * *